United States Patent
Wentworth et al.

(10) Patent No.: US 6,522,823 B1
(45) Date of Patent: Feb. 18, 2003

(54) LOW PROFILE CABLE EXIT TROUGH

(75) Inventors: Michael J. Wentworth, Belle Plaine, MN (US); Wayne Giesen, Waconia, MN (US); Brian L. Johnson, Maple Grove, MN (US); Wayne Albin Johnson, Rosemount, MN (US); Thomas Walter Kampf, Minnetonka, MN (US); John Van Scoy, Shakopee, MN (US); Alex Watts, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/707,182

(22) Filed: Nov. 6, 2000

(51) Int. Cl.[7] ................................................. G02B 6/00
(52) U.S. Cl. ...................................................... 385/134
(58) Field of Search ................................... 385/134–137

(56) References Cited

U.S. PATENT DOCUMENTS

| 5,067,678 A | 11/1991 | Henneberger et al. |
| 5,160,811 A | 11/1992 | Ritzmann |
| 5,161,580 A | 11/1992 | Klug |
| 5,240,209 A | 8/1993 | Kutsch |
| 5,271,585 A | 12/1993 | Zetena, Jr. |
| 5,316,243 A | 5/1994 | Henneberger |
| 5,316,244 A | 5/1994 | Zetena, Jr. |
| 5,335,349 A | 8/1994 | Kutsch et al. |
| 5,503,354 A | 4/1996 | Lohf et al. |
| 5,752,781 A | 5/1998 | Haataja et al. |
| 5,923,753 A | 7/1999 | Haataja et al. |
| 5,937,131 A | 8/1999 | Haataja et al. |
| 5,995,699 A | 11/1999 | Vargas et al. |
| 6,037,538 A | 3/2000 | Brooks |
| 6,076,779 A | 6/2000 | Johnson |

OTHER PUBLICATIONS

Exhibit F Panduit Installation Instructions for 6×4 Spill–Over Junction and Spill–Over Duct Cover, 4 pages.
ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995.
ADC Telecommunications brochure entitled "Fiber Guide™ Fiber Management System," 6 pages, dated Jun., 1989.
ADC Telecommunications brochure entitled "ADC Fiber-Guide® System Express Exit™ 2×2," 2 pages, dated May 1999.
ADC Telecommunications brochure entitled "FiberGuide® Fiber Management Systems," 37 pages, dated Jun. 1998.

*Primary Examiner*—Akm E. Ullah
*Assistant Examiner*—Jerry T Rahll

(57) ABSTRACT

A low profile cable exit trough including an arch-wall with a sidewall portion. A projecting member extends from a concave surface of the arch-wall and is spaced from the sidewall portion to receive a top end of an upstanding side of a lateral trough therebetween. The arch-wall passes through the plane occupied by the upstanding side of the lateral trough at a significant angle, i.e. greater than or equal to 15 degrees, in order to allow for a lower profile above the lateral trough.

16 Claims, 7 Drawing Sheets

LOW PROFILE CABLE EXIT TROUGH

FIELD OF THE INVENTION

The invention pertains to systems for the management and routing of optical fiber cables.

BACKGROUND OF THE INVENTION

In the telecommunications industry, the use of optical fibers for signal transmission is accelerating. With the increased utilization of optical fiber systems, optical fiber cable management requires industry attention.

On area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not bend beyond a minimum radius of curvature. For example, it is commonly recognized that optical fibers should not be bent in a radius of less than 1.5 inches. U.S. Pat. No. 5,937,131 discloses an optical cable exit trough addressing some of these concerns, however, there remains room for improvement. Specifically, when cable troughs are placed near ceiling areas, an exit trough mounted thereto may not fit between the cable trough and the ceiling or ceiling fixtures such as light fixtures. Therefore, there is a need for lower profile exit troughs which still maintain the minimum bend radii required to protect the system cables.

SUMMARY OF THE INVENTION

According to preferred embodiments of the present invention, a cable routing system is disclosed for routing optical fiber cables between optical transmission equipment. The system includes a lateral trough configured for defining a cable pathway. The lateral trough typically includes a planar upstanding side with a top end. An exit trough according to the present invention is mountable to the lateral trough to provide a cable exit pathway from the lateral trough. The exit trough includes an arch-wall having an upper convex surface and a lower concave surface, and a sidewall portion. The sidewall portion is positionable inside the lateral trough so that the arch-wall is not extending tangentially from the upstanding side. The arch-wall instead crosses the plane occupied by the upstanding side in a non-tangent direction adjacent the top edge, such as at an angle greater than or equal to 15 degrees. The arch-wall protects the cable from the top edge of the lateral trough. The sidewall portion extends into the interior of the lateral trough sufficient to provide cable protection of cables extending from the lateral trough to the exit trough.

The exit trough includes a projecting member extending from the concave surface of the arch-wall and spaced from the sidewall portion of the arch-wall to receive between the sidewall portion and the projecting member a portion of the upstanding side of the lateral trough adjacent to the top edge of the lateral trough. An exit trough portion extends from a middle of the sidewall portion in a direction away from the lateral trough. The exit trough portion is defined by a convexly curved surface of the arch-wall as well as two convexly curved upstanding side surfaces on opposite sides of the bottom trough surface.

The exit trough defines a cable pathway leading upwardly and away from the lateral trough. By crossing the plane of the upstanding side of the lateral trough at an angle adjacent the top edge instead of exiting tangentially, the exit trough maintains a lower profile, allowing for ease of use near ceilings and ceiling fixtures. The exit trough is mountable to the lateral trough without modification to the lateral trough. The exit trough can be placed generally at any location along the lateral trough, and can be placed during initial system setup, or at a later time as the need arises for an exit pathway from the lateral trough, such as when new optical transmission equipment is added to the system. The exit trough may include a downspout portion defining a downwardly directed cable pathway, or other directional pathway as desired.

In one preferred embodiment the exit trough includes curved cable guide walls at opposite ends of the sidewall portion. The curved cable guide walls assist in guiding the cables into the exit trough from the lateral trough without bending the cables beyond their minimum bend radius.

In another preferred embodiment of the present invention, the sidewall portion is curved at opposite ends to meet an interior surface of the upstanding wall of the lateral trough.

DETAILED DESCRIPTION OF THE PREFERRED EMBODIMENTS

Figure 1:
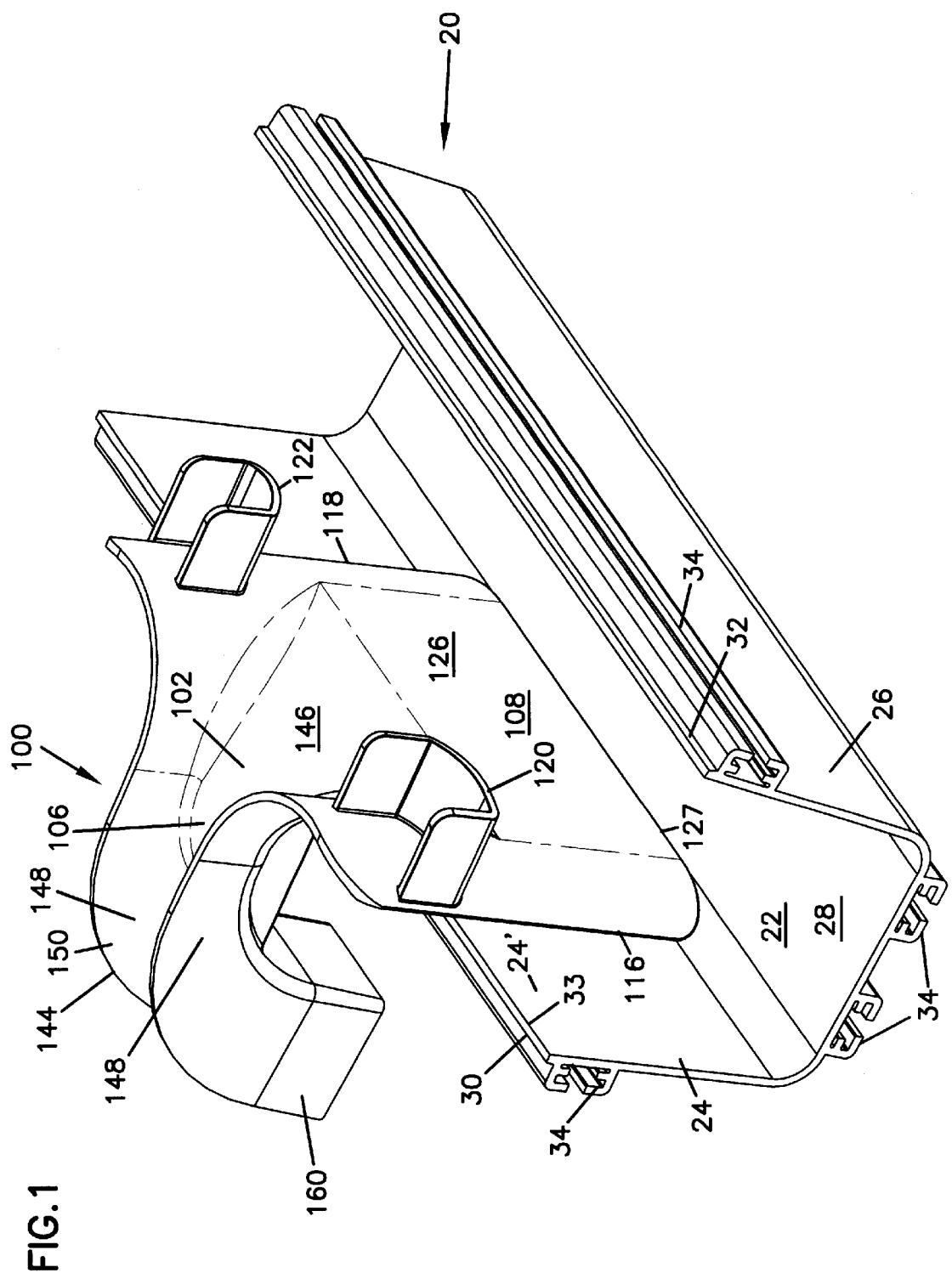
FIG. 1 shows a first perspective view of an exit trough according to the present invention mounted to a lateral trough.
Figure 2:
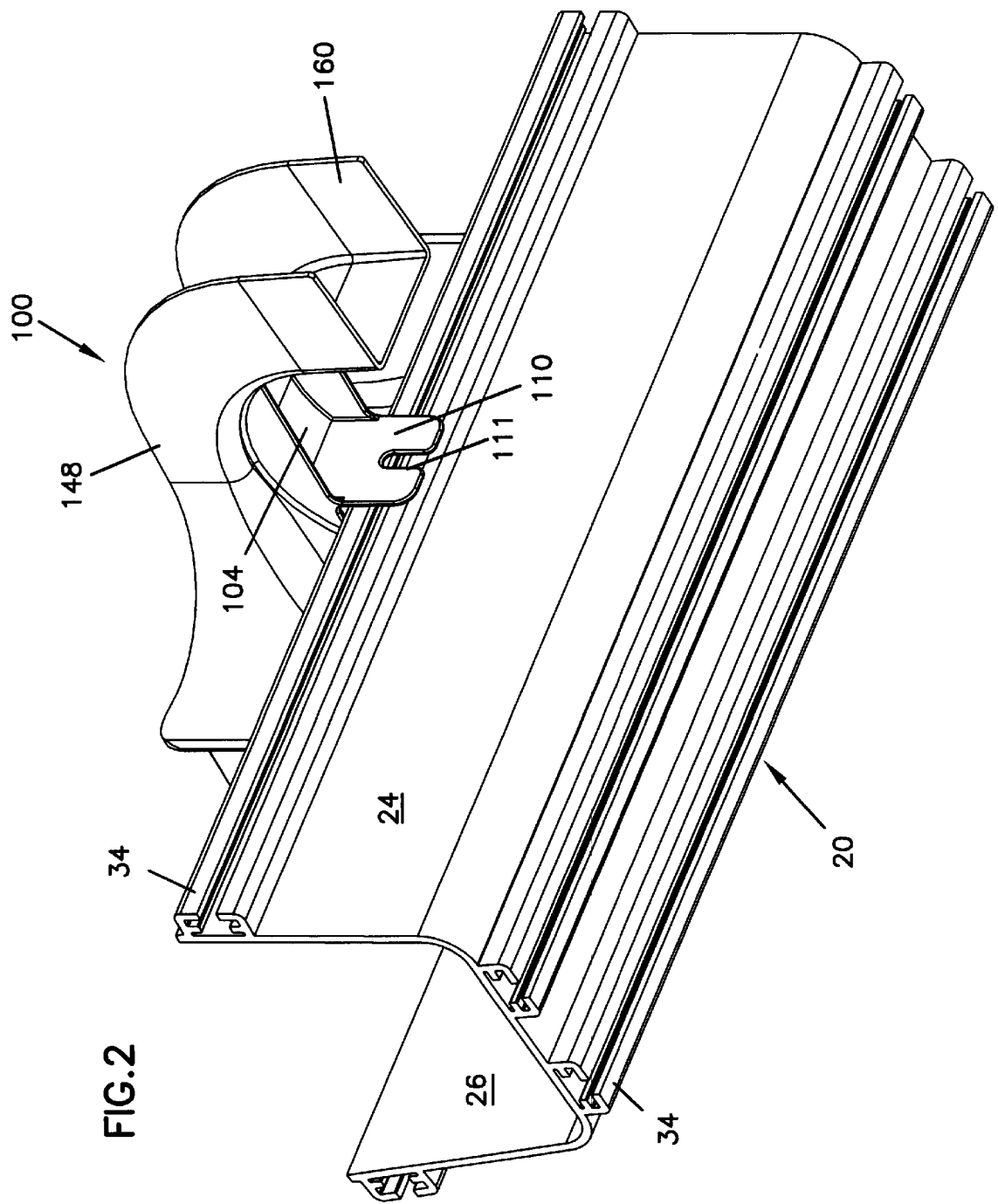
FIG. 2 shows a second perspective view of the assembly of FIG. 1.
Figure 3:
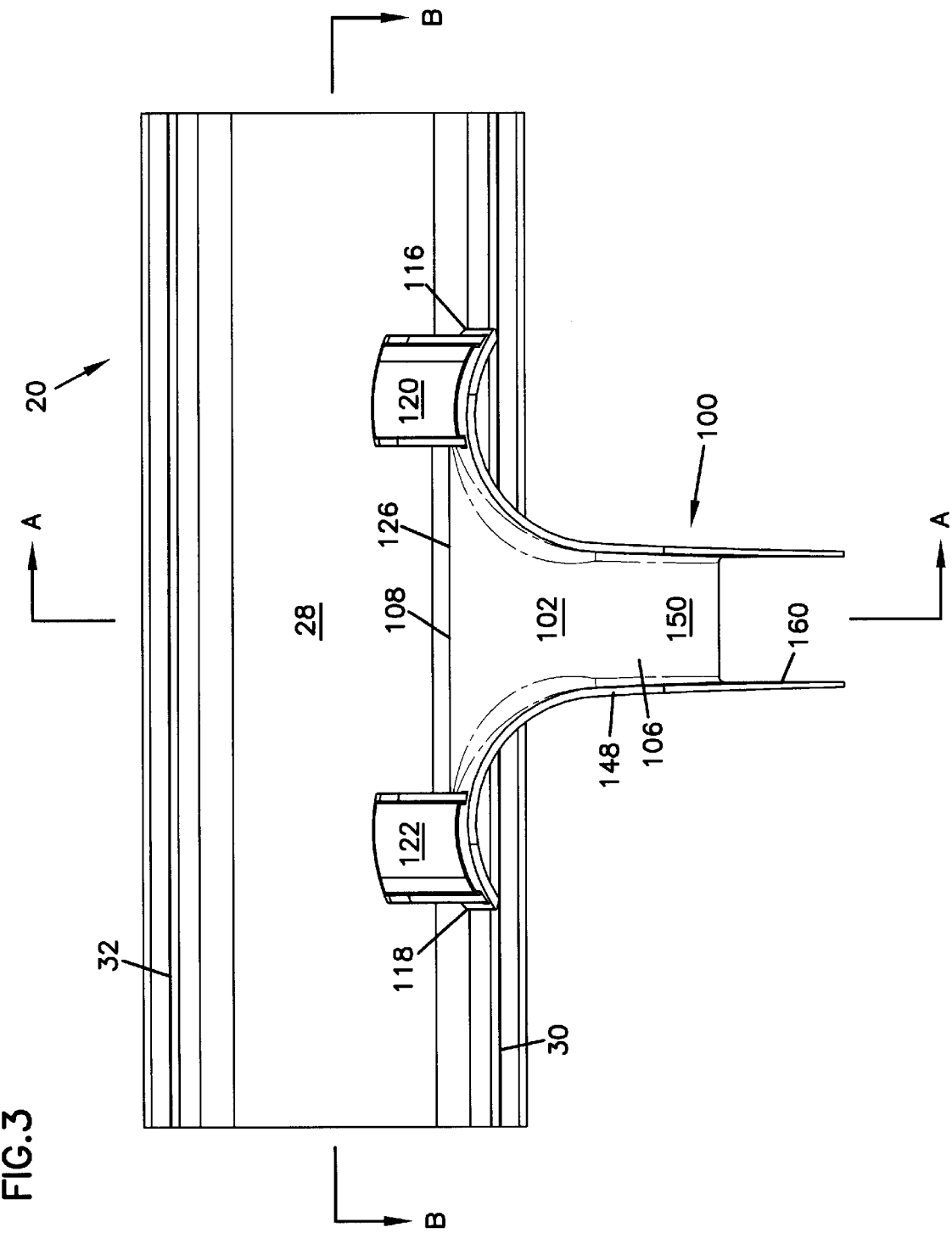
FIG. 3 is a top view of the assembly of FIG. 1.

Referring now to FIGS. 1–7, in which identical components are numbered identically, a first embodiment of an exit trough 100 is shown mounted to a lateral trough 20. Lateral trough 20 defines a cable pathway 22 for routing optical fiber cables between locations. Lateral trough 20 and exit trough 100 can be part of a cable routing system typically within a structure, such as a building having optical fiber signal transmitting equipment. Lateral trough 20 typically is suspended from a ceiling structure by any suitable means (not shown). U.S. Pat. Nos. 5,067,678 and 5,316,243 disclose various cable routing systems, including lateral troughs like lateral trough 20. Exit trough 100 is not only usable with lateral trough 20, but also with other cable routing systems disclosed in U.S. Pat. Nos. 5,067,678 and 5,316,243, the disclosures of which are hereby incorporated by reference, and other cable routing systems. Exit trough 100 is an improvement over the exit troughs shown and described in U.S. Pat. No. 5,937,131, the disclosure of which is hereby incorporated by reference.

Generally, lateral trough 20 includes first and second upstanding sides 24, 26, and a bottom 28 extending therebetween and defining cable pathway 22. Side 24 includes a top edge 30. Opposite side 26 also includes similar top edge 32. Lateral trough 20 includes a plurality of attachment members 34 on an outside portion for use in attaching lateral troughs 20 together end to end, or adding other system hardware.

As will be described below, exit trough 100 mounts to lateral trough 20 adjacent to top edge 30 of side 24. Exit trough 100 creates a cable exit pathway from lateral trough 20. Preferably, exit trough 100 mounts to lateral trough 20 through attachment member 34, such as with a fastener.

Figure 4:
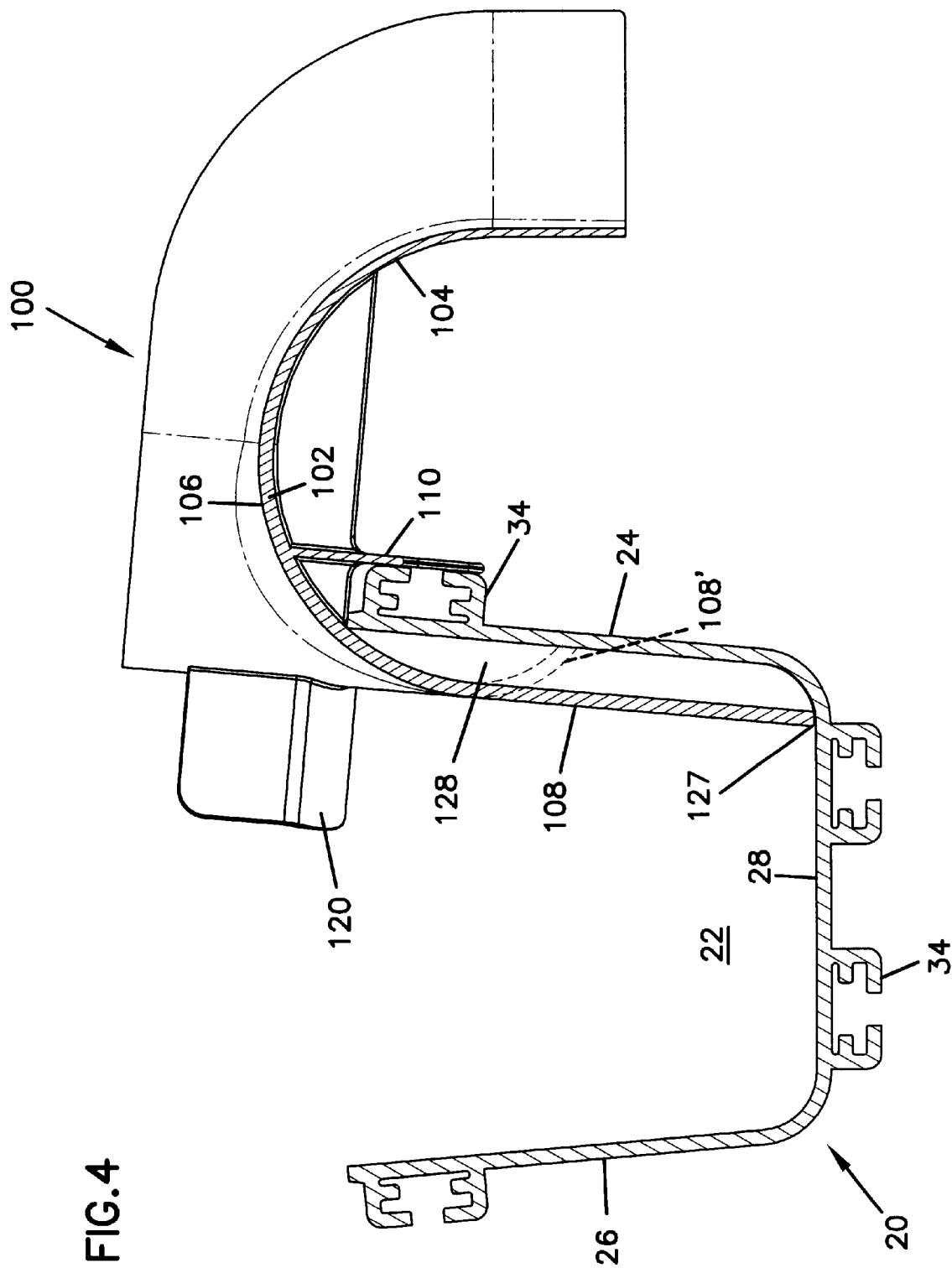
FIG. 4 is a cross-section of the assembly of FIG. 3 along line A—A.
Figure 5:
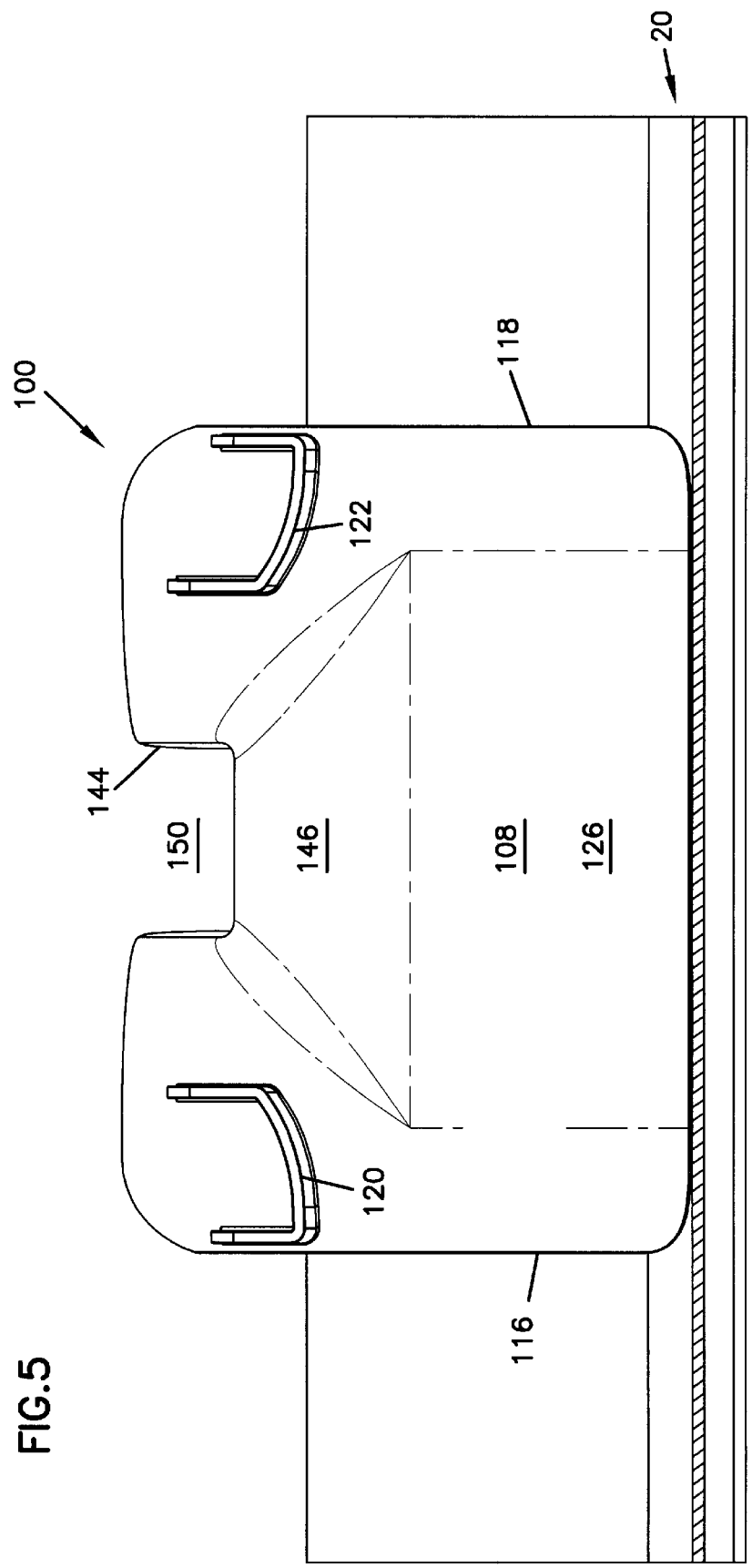
FIG. 5 is a cross-section of the assembly of FIG. 3 along line B—B.
Figure 6:
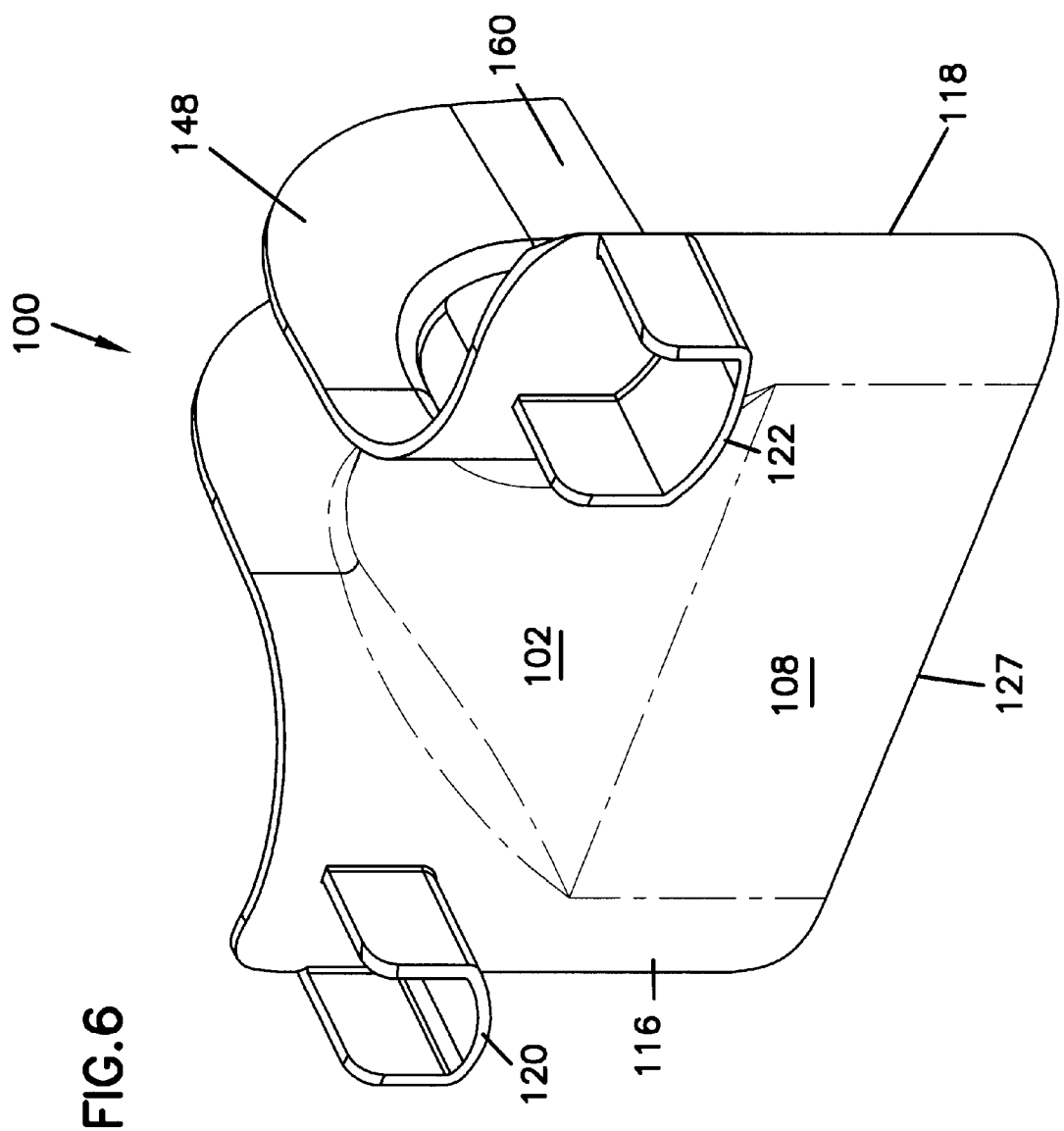
FIG. 6 is a perspective view of the exit trough of FIG. 1 without the lateral trough.

Exit trough 100 includes an arch-wall 102 as best seen in FIG. 4. The arch-wall 102 has both a lower concave 104 surface and an upper convex surface 106. The arch-wall 102 also includes a projecting sidewall portion 108. From the concave surface 104 of the arch-wall 102 extends an outer projecting member 110. Projection member 110 is spaced from the sidewall portion 108 of the arch-wall 102 to receive between the sidewall portion 108 and the projecting member 110 a portion of the upstanding side 24 of the lateral trough 20 adjacent to the top edge 30 of the lateral trough 20. Projecting member 110 defines a fastener opening 111. Exit trough 100 conveniently and securely mounts to lateral trough 20 via one or more fasteners 103 positioned through projecting member 110 and engaged with attachment member 34 of lateral trough 20.

Figure 7:
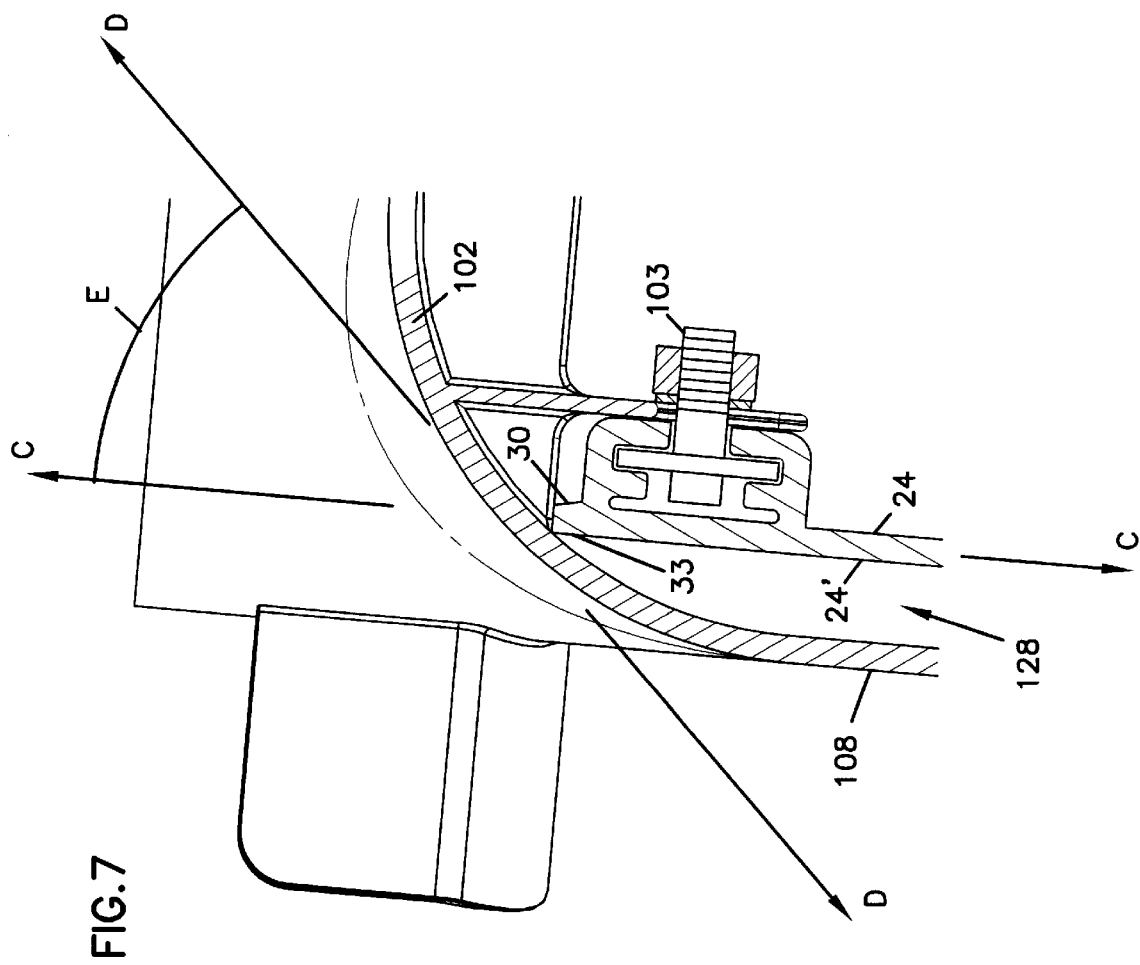
FIG. 7 is a detail view of a portion of FIG. 4.

The sidewall portion 108 is positionable inside the lateral trough 20 so that the arch-wall 102 crosses the plane occupied by the upstanding side 24 at a significant angle. If the arch-wall 102 emerged from the trough at a tangent to the plane of the upstanding side 24 or at an insignificant angle, the exit trough would require increased vertical space in order to complete an arch with curvature equal to or greater than the minimum bend radius of the cable. The present invention, therefore, presents a lower profile by allowing the cable to cross the plane occupied by the upstanding wall 24 at a significant angle, for example, equal to or greater than 15 degrees. This aspect is best illustrated in FIG. 7. In FIG. 7 line C—C is the plane occupied by upstanding side 24. Line D—D is the angle E at which the arch-wall 102 crosses the plane (line C—C) occupied by upstanding side 24. In the present invention, the angle E between line C—C and line D—D is greater than 15 degrees, and preferably about 30–45 degrees.

Sidewall portion 108 generally extends laterally from a first end 116 to a second end 118. A middle 126 is positioned between the first and second ends 116, 118. At first and second ends 116, 118, the sidewall portion 108 preferably is curved to meet an interior surface 24' of the upstanding side 24. The ends 116 and 118 are curved to protect the cables from bending beyond the minimum bend radius. A bottom edge 127 is positioned adjacent to bottom 28. Alternatively, the sidewall portion 108 can be curved to meet the interior surface 24' on the upstanding side 24 at an intermediate point along side 24. See dashed lines 108' in FIG. 4. As constructed, middle 126 is spaced from interior surface 24' of upstanding side 24 at area 128. Such a construction allows arch-wall 102 to cross the plane of the upstanding side 24 at the top corner 33 of the top edge 30, to protect the cables from being bent below the minimum bend radius.

The cable exit trough 100 may also include curved cable guide walls 120 and 122 at opposite ends of the sidewall portion 108. The curved cable guide walls 120 and 122 assist in guiding the cables from the lateral trough 20 without bending the cables beyond their minimum bend radius.

Exit trough 100 includes an exit trough portion 144 extending from sidewall portion 108 at middle 126 away from lateral trough 20. Exit trough portion 144 is defined by a bottom trough surface 146, which is the convex surface 106 of the arch-wall 102, and upstanding sides 148 on opposite sides of bottom trough surface 146. At the point where bottom trough surface 146 crosses the plane occupied by the upstanding side 24 is at a significant angle, i.e. equal to or greater than 15 degrees, relative to the plane. Upstanding sides 148 also define convexly curved shapes. Exit trough portion 144 defines a cable pathway 150 in communication with cable pathway 22 of lateral trough 20.

In exit trough 100, exit trough portion 144 links lateral trough 20 to a downspout 160. Downspout 160 generally provides a cable pathway for cable exiting in a downward direction relative to lateral trough 20.

With exit trough 100 mounted to lateral trough section 20, cable extending generally horizontally to the ground through lateral trough section 20 is allowed to route upwardly and away from lateral trough section 20, and then to route downwardly through downspout 160 for connection to optical transmission equipment, or other uses. Downspout 160 is connectable via any suitable means to other cable routing components, such as vertical troughs or conduit, as desired. The various curves provided with exit trough 100 help protect the optical fiber cables from being bent beyond a minimum radius of curvature.

The disclosed exit trough 100 allows for exit pathways from the lateral trough section 20 without modification to the lateral trough section 20. This is useful during initial system setup, and also during modifications of the system at later dates. Exit trough 100 can be added at any time quickly and easily. Cable damage is avoided since any cables in lateral trough section 20 are not disturbed and do not have to be moved when exit troughs 100 are added. Also, in the preferred embodiment, fasteners are all that is needed to mount the projecting member 110 of the exit trough 100 to the lateral trough section 20. In addition to the downspout 160 other directional components are possible from exit trough portions 144 of exit trough 100 such as horizontal portions which lead horizontally away from the lateral trough instead of vertically.

Exit trough 100 is an improvement over the exit troughs shown in U.S. Pat. No. 5,937,131, since a lower vertical height of the lateral trough and the exit trough is achieved by the present invention. By crossing the arch-wall of the exit trough and the upstanding wall top edge at a significant angle, a lower vertical profile can be achieved, without exposing the cables to sharp bends. Because the arch-wall crosses at the more significant angle, the sidewall portion 108 projects into and takes up more space in lateral trough 20 than the troughs in U.S. Pat. No. 5,937,131 which exit closer to a tangential arrangement. While this leads to some loss of lateral trough space for the cables, the vertical profile concern is addressed.

Having described the present invention in its preferred embodiment, modifications and equivalents may occur to one skilled in the art. It is intended that such modifications and equivalents shall be included within the scope of the claims which are appended hereto.

What is claimed is:

1. A cable exit trough mountable to a lateral trough, the lateral trough defining a trough interior and cable pathway and including an upstanding side terminating in a top edge, the upstanding side disposed in a first plane, the exit trough comprising:

an arch-wall having a lower concave surface and an upper convex surface, the arch-wall including a sidewall portion, the sidewall portion including first and second ends and a middle therebetween, the sidewall portion positionable inside the lateral trough so that the arch-wall crosses a horizontal plane at the top edge at an angle relative to the first plane;

a projecting member extending from the concave surface of the arch-wall and spaced from the sidewall portion of the arch-wall to receive between the sidewall portion and the projecting member a portion of the upstanding side of the lateral trough adjacent to the top edge of the lateral trough;

an exit trough portion extending from the middle of the sidewall portion in a direction away from the lateral trough when the exit trough is mounted to the lateral trough, the exit trough portion defining a cable pathway in communication with the cable pathway of the lateral trough when the exit trough is mounted to the lateral trough, the convex surface of the arch-wall defining a bottom trough surface of the exit trough portion, the exit trough portion further being defined by two convexly curved, upstanding side surfaces on opposite sides of the bottom trough surface.

2. The cable exit trough of claim 1 wherein the first and second ends of the sidewall portion are curved to meet an interior surface of the upstanding side of the lateral trough.

3. The cable exit trough of claim 1 further comprising first and second curved cable guide walls disposed on the first and second ends of the sidewall portion respectively.

4. The cable exit trough of claim 1 wherein the sidewall portion meets a bottom surface of the lateral trough when the exit trough is mounted to the lateral trough.

5. The cable exit trough of claim 1 wherein the arch-wall crosses the first plane at an angle greater than or equal to 15 degrees relative to the first plane.

6. The cable exit trough of claim 5 wherein the arch-wall crosses the first plane at an angle greater than or equal to 30 degrees relative to the first plane.

7. A cable exit trough mountable to a lateral trough, the lateral trough defining a trough interior and cable pathway and including an upstanding side terminating in a top edge, the upstanding side disposed in a first plane, the exit trough comprising:

an arch-wall having a lower surface and an upper convex surface, the arch-wall including a sidewall portion, the sidewall portion including first and second ends and a middle therebetween, the sidewall portion positionable inside the lateral trough so that the upper convex surface of the arch-wall crosses the first plane;

wherein the first and second ends of the sidewall portion include curved regions to meet an interior surface of the upstanding side of the lateral trough;

wherein the sidewall portion meets a bottom surface of the lateral trough when the exit trough is mounted to the lateral trough;

a projecting member extending from the lower surface of the arch-wall and spaced from the sidewall portion of the arch-wall to receive between the sidewall portion and the projecting member a portion of the upstanding side of the lateral trough adjacent to the top edge of the lateral trough;

an exit trough portion extending from the middle of the sidewall portion in a direction away from the lateral trough when the exit trough is mounted to the lateral trough, the exit trough portion defining a cable pathway in communication with the cable pathway of the lateral trough when the exit trough is mounted to the lateral trough, the convex surface of the arch-wall defining a bottom trough surface of the exit trough portion, the exit trough portion further being defined by two convexly curved, upstanding side surfaces on opposite sides of the bottom trough surface;

first and second curved cable guide walls disposed on the first and second ends of the sidewall portion respectively.

8. A cable exit trough mountable to a lateral trough, the lateral trough defining a trough interior and cable pathway and including an upstanding side terminating in a top edge, the upstanding side disposed in a first plane, the exit trough comprising:

an arch-wall having a lower surface and an upper convex surface, the arch-wall including a sidewall portion, the sidewall portion including first and second ends and a middle therebetween, the sidewall portion positionable inside the lateral trough so that the arch-wall crosses the first plane at an angle relative to the first plane, wherein the sidewall portion includes a middle region spaced from an interior surface of the upstanding side;

a projecting member spaced from the sidewall portion of the arch-wall to receive between the sidewall portion and the projecting member a portion of the upstanding side of the lateral trough adjacent to the top edge of the lateral trough;

an exit trough portion extending from the middle of the sidewall portion in a direction away from the lateral trough when the exit trough is mounted to the lateral trough, the exit trough portion defining a cable pathway in communication with the cable pathway of the lateral trough when the exit trough is mounted to the lateral trough, the convex surface of the arch-wall defining a bottom trough surface of the exit trough portion, the exit trough portion further being defined by two convexly curved, upstanding side surfaces on opposite sides of the bottom trough surface.

9. The cable exit trough of claim 8 wherein the first and second ends of the sidewall portion are curved to meet an interior surface of the upstanding side of the lateral trough.

10. The cable exit trough of claim 8 further comprising first and second curved cable guide walls disposed on the first and second ends of the sidewall portion respectively.

11. The cable exit trough of claim 8 wherein the sidewall portion meets a bottom surface of the lateral trough when the exit trough is mounted to the lateral trough.

12. The cable exit trough of claim 8 wherein the arch-wall crosses the first plane at an angle greater than or equal to 15 degrees relative to the first plane.

13. The cable exit trough of claim 12 wherein the arch-wall crosses the first plane at an angle greater than or equal to 30 degrees relative to the first plane.

14. A cable exit trough mountable to an upstanding side of a lateral trough, the lateral trough defining a cable pathway, the upstanding side having uniform height, the exit trough comprising:

an arch-wall defining a convexly curved surface;

opposed curved side surfaces separated by the arch-wall, the side surfaces with the arch-wall forming a curved exit pathway;

wherein, when mounted to the lateral trough the exit pathway leads over the top of the upstanding side; and wherein when mounted to the lateral trough a curved portion of the arch-wall extends into the lateral trough and is spaced inwardly from an innermost surface of the upstanding side.

15. The cable exit trough of claim 14 wherein the curved portion of the arch-wall extending into the lateral trough is sufficiently spaced inwardly from the innermost surface of the upstanding side so that the arch-wall crosses a plane defined by the upstanding side at an angle greater than 15 degrees.

16. The cable exit trough of claim 15 wherein the angle is greater than 30 degrees.

* * * * *